(12) United States Patent
Beckman et al.

(10) Patent No.: US 9,739,870 B1
(45) Date of Patent: Aug. 22, 2017

(54) TRACKING UNMANNED AERIAL VEHICLES USING REFLECTED LIGHT

(71) Applicant: Amazon Technologies, Inc., Seattle, WA (US)

(72) Inventors: Brian C. Beckman, Newcastle, WA (US); Menashe Haskin, Kfar Vitkin (IL); Gershon Parent, Seattle, WA (US); Scott Michael Wilcox, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 165 days.

(21) Appl. No.: 14/829,111

(22) Filed: Aug. 18, 2015

(51) Int. Cl.
*G01S 5/16* (2006.01)
*B64C 39/02* (2006.01)
*B64D 45/00* (2006.01)
*G01S 5/00* (2006.01)

(52) U.S. Cl.
CPC .............. *G01S 5/16* (2013.01); *B64C 39/024* (2013.01); *B64D 45/00* (2013.01); *G01S 5/0027* (2013.01)

(58) Field of Classification Search
CPC ....... G01S 5/16; G01S 5/0027; B64C 39/024; B64D 45/00

USPC ....................................................... 250/203.2
See application file for complete search history.

(56) References Cited

U.S. PATENT DOCUMENTS

| 8,385,065 B2 * | 2/2013 | Weaver ................ | G03B 15/006 165/104.33 |
| 2015/0353206 A1 * | 12/2015 | Wang ........................ | B64F 1/00 244/114 R |
| 2016/0059963 A1 * | 3/2016 | Burgess ................... | B64D 1/12 701/49 |

* cited by examiner

*Primary Examiner* — Seung C Sohn
(74) *Attorney, Agent, or Firm* — Athorus, PLLC

(57) ABSTRACT

This disclosure describes systems and methods for visually tracking a position of an unmanned aerial vehicle ("UAV") using reflected light. A light source at an origin location, such as the location of an operator of the UAV, is aligned and emitted toward the position of the UAV. The emitted light source reflects off a reflector coupled to the UAV toward a location of the operator or a visual observer working with the operator. The reflected light increases the visibility of the UAV, thereby extending the distance from an operator at which the UAV can be operated while maintaining visible contact between the operator and/or a visual observer working with the operator and the UAV.

20 Claims, 8 Drawing Sheets

TRACKING UNMANNED AERIAL VEHICLES USING REFLECTED LIGHT

BACKGROUND

Unmanned aerial vehicles ("UAV") are becoming more common. Many of these vehicles include a body configuration that will support the separation of the multiple propellers, the control components, the power supply (e.g., battery), etc. Existing regulations require that operation of some UAVs be performed such than an operator of the UAV or a visual observer working with the operator maintain visual contact with the UAV. In some instances, this visual contact must be unaided by optics or other devices. Such regulations put limits on the operational range of the UAV because the UAV becomes difficult to visually detect at longer distances.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean "including, but not limited to." Additionally, as used herein, the term "coupled" may refer to two or more components connected together, whether that connection is permanent (e.g., welded) or temporary (e.g., bolted), direct or indirect (i.e., through an intermediary), mechanical, chemical, optical, or electrical. Furthermore, as used herein, "horizontal" flight refers to flight traveling in a direction substantially parallel to the ground (i.e., sea level), and that "vertical" flight refers to flight traveling substantially radially outward from the earth's center. It should be understood by those having ordinary skill that trajectories may include components of both "horizontal" and "vertical" flight vectors.

DETAILED DESCRIPTION

This disclosure describes systems and methods for visually tracking a position of an unmanned aerial vehicle ("UAV") using reflected light. A light source at an origin location, such as the location of an operator or visual observer of the UAV, is aligned and emitted toward the position of the UAV. The emitted light source reflects off a reflector coupled to the UAV and toward a location of the operator or visual observer working with the operator. The reflected light increases the visibility of the UAV, thereby extending the distance from which the UAV can be operated while maintaining visible contact between the operator and/or a visual observer working with the operator and the UAV. Likewise, by reflecting a light source off a reflector of the UAV, rather than emitting a light directly from the UAV, the power requirements of the UAV are reduced. Specifically, the UAV does not need to consume power to power a light source, nor does it need to consume additional power to lift the additional weight of a light source.

Unless otherwise specified herein, an operator and a visual observer are referred to generally as a visual observer. As such, a visual observer should be construed to mean an operator of the UAV or a visual observer working with an operator of the UAV.

Figure 1:
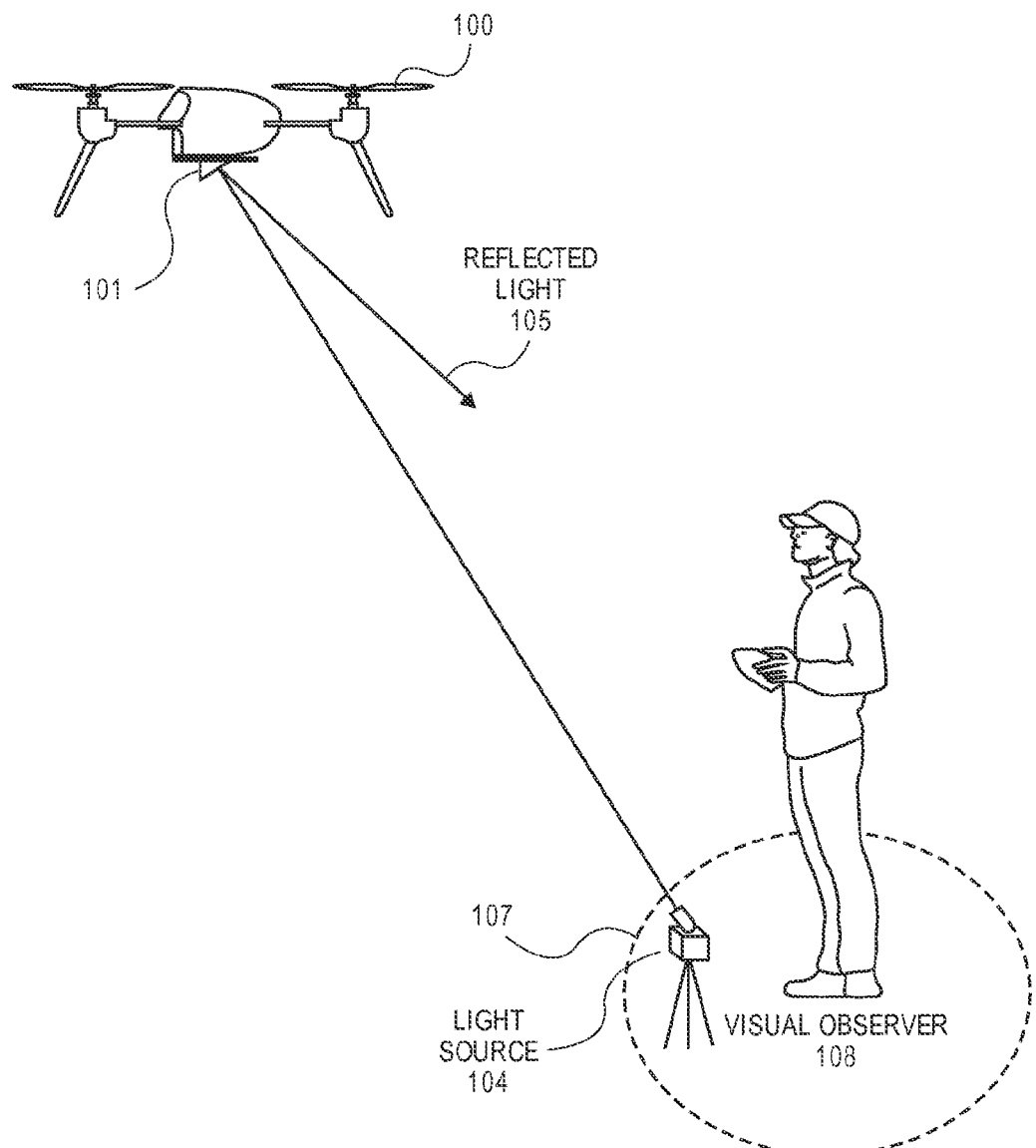
FIGS. 1-3 depict views of environments in which unmanned aerial vehicle tracking is performed by reflecting a light off of the unmanned aerial vehicle, according to various implementations.
Figure 2:
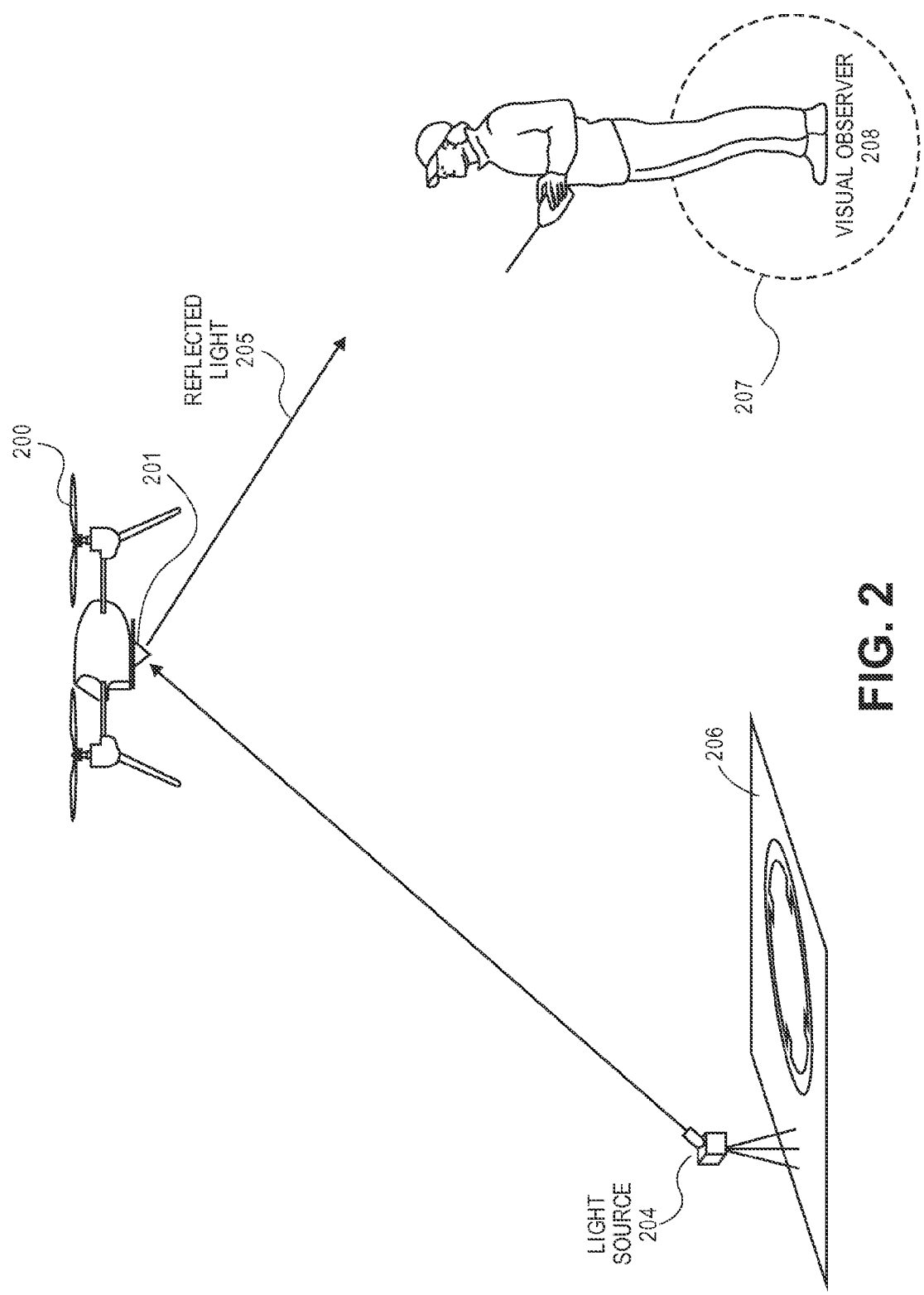
Figure 3:
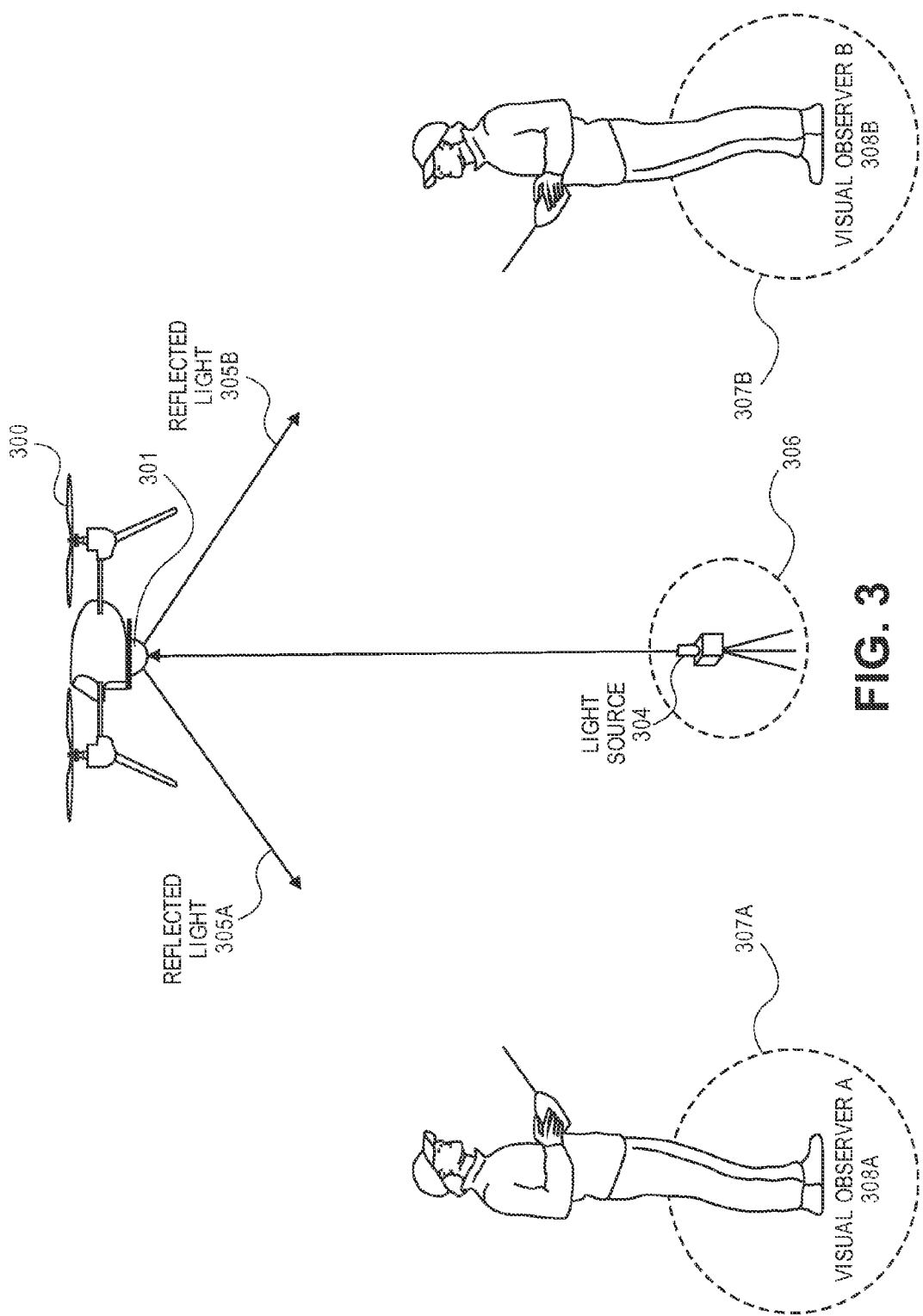

FIGS. 1-3 depict views of environments in which UAV tracking is performed by reflecting a light off of the UAV, according to various implementations. Turning first to FIG. 1, illustrated is a UAV 100 that, as discussed further below with respect to FIG. 4, includes a frame and at least one reflector 101. The reflector may be any type of reflective material or component that can reflect light. For example, the reflector may be a mirror, metal, Mylar, glass, etc. In some implementations, the reflector is a retroreflector or retroreflective tape. A retroreflector is a device or surface that reflects light back to its source with a minimum of scattering.

The reflector may be mounted in a stationary position and coupled to the frame of the UAV 100, coupled to a propeller of the UAV, extended or otherwise hung from the UAV 100, be mounted to a gimbal of the UAV 100, etc.

To extend the distance between the UAV 100 and the visual observer 108 while still enabling the visual observer to maintain visual contact with the UAV 100, a light source 104, such as a collimated light source (e.g., laser), emits light from a light source location toward a position of the UAV. In this example, the light source location is the same location as the visual observer 108. The light source may be a device that is independent of the visual observer, as illustrated in FIG. 1, may be incorporated into a controller used by the visual observer to control the UAV 100, and/or may be coupled to the visual observer. For example, the light source may be worn by the visual observer (e.g., on their head) and the direction of the light source is controlled by the position or movement of the visual observer.

The emitted light reflects off a reflector 101 of the UAV 100 and returns as reflected light 105 to a viewing location. The viewing location may be any defined location to which the reflected light 105 is directed. In some implementations, the light source location and the viewing location 107 of the visual observer 108 may be the same location, as illustrated in FIG. 1. Likewise, in some implementations, one or more of the viewing location and/or the light source location may be moving. For example, the viewing location may be in an automobile, aircraft, or watercraft such that the visual observer moves as they maintain visual contact with the UAV. In another example, the light source may be mounted on an automobile, aircraft, or watercraft and be moved as it emits a light toward the direction of the UAV.

FIG. 2 illustrates another example environment where the distance from which a UAV 200 is visible by a visual observer 208 is extended by reflecting a light off a reflector 201 of the UAV 200. In the implementation discussed with respect to FIG. 2, the light source location 206 at which a light source 204 is located is geographically distinct from the viewing location 207, at which the visual observer 208 is located. In this example, the light source location 206 is a landing area for the UAV 200 and the emitted light may be used as a guide to the UAV in locating and landing the UAV at the landing area. For example, the UAV may include one or more light sensors that receive the emitted light and provide guidance to aid in the navigation and/or landing of the UAV at the light source location 206. Likewise, the light that is emitted from the light source 204 toward the position of the UAV 200 is reflected by the reflector 201 coupled to the UAV 200 such that it is viewable at the viewing location 207 by a visual observer 208, such as an operator.

FIG. 3 illustrates yet another example environment where the distance from which a UAV is visible by a visual observer 308 is extended by reflecting a light off a reflector 301 of a UAV 300, according to an implementation. In this example, there are a plurality of viewing locations 307A, 307B along a navigation path of the UAV 300. Likewise, there may be one or more light sources 304 and corresponding light source locations 306. As illustrated, one or more of the viewing locations 307, and/or light source locations 306 may be the same or different locations. Likewise, in some implementations the operator of the UAV and the visual observer may be at different locations and communicating with one another. Alternatively, each of the visual observers may be operators that control the operation of the UAV while in visual contact with the UAV. In still another example, there may be a single operator of the UAV positioned at a first location that is in communication with each visual observer positioned at the respective viewing locations.

In one implementation, multiple viewing locations may be located along a navigation path of a UAV and one or more visual observers 308 may be positioned at the viewing locations 307. As the UAV aerially navigates along the navigation path, the light is emitted from the light source 204 in a direction toward the position of the UAV 300 and the reflector of the UAV is oriented such that the light is reflected toward a viewing location along the navigation path so that the UAV is visible to a visual observer 308 at the viewing location. As the UAV continues along the navigation path and approaches another viewing location, the reflector of the UAV may be reoriented so that the light is reflected toward a second viewing location along the navigation path.

As an example, referring to FIG. 3, as the UAV 300 aerially navigates along a navigation path, a light source 304 emits a light in a direction of the position of the UAV 300. Likewise, the UAV 300 determines a location of a nearest viewing location, such as viewing location 307A and orients the UAV 300 and/or the reflector 301 of the UAV 300 such that the light is reflected as reflected light 305A off the reflector toward the location of the viewing location 307A. As the UAV 300 continues to aerially navigate along the navigation path, the position of the light source 304 and/or the reflector 301 may be adjusted so that the light emitted from the light source 304 continues to be reflected off the reflector 301 of the UAV toward the viewing location 307A.

As the distance between the UAV 300 and the first viewing location 307A increases and the distance between the UAV 300 and the second viewing location 307B decreases, the UAV may reorient the reflector 301 such that the light emitted from the light source 304 is reflected off the reflector 301 of the UAV toward the location of the second viewing location 307B. By reorienting the reflector such that the light is reflected toward the location of the second viewing location, the UAV can be visually tracked by a second observer 308B positioned at the second viewing location 307B. This may continue as the UAV aerially navigates along the navigation path.

Likewise, in some implementations, multiple light source locations 306, each with a respective light source, may be located along the navigation path. In such a configuration, as the UAV aerially navigates along the navigation path and the distance between the UAV 300 and a first light source location increases and a distances between the UAV 300 and a second light source location decreases, the UAV may adjust the reflector so that it begins reflecting the light emitted from a second light source positioned at the second light source location.

While the examples discussed above with respect to FIGS. 1-3 illustrate the light source locations and viewing locations as stationary, in some implementations, one or both of the light source location and viewing location may be moving. For example, the light source may be coupled to an automobile, aircraft, watercraft, train, etc. and emit a light toward a direction of the UAV as the light source is moving. Likewise, the viewing location may be associated with an automobile, aircraft, watercraft, train, etc. and a visual observer at the viewing location may maintain contact with the UAV as the visual location is moving.

In each of the implementations discussed above, one or more of the UAV position, light source location(s), and/or viewing location(s) may be transmitted between the UAV, light source, and/or a remote computing resource that provides information to and/or controls the light source. For example, if each of the light source location, viewing location, and UAV are moving, each may transmit position or location information. For example, the UAV may transmit position information to the UAV. Likewise, position information may be transmitted to the UAV indicating the location of the light source location and viewing location. Alternatively, if the light source location and/or the viewing location are stationary, the UAV may maintain light source location information and/or viewing location information in a memory of the UAV and only transmit position information to the light source and/or a computing resource that controls the light source.

In still yet another implementation, the position information of the UAV may be actively monitored and determined by the light source and/or the computing resource that controls the light source. For example, as the light is emitted in a direction of the UAV, the light source may detect the reflection of the light and periodically update a position of the UAV. The direction, altitude, and/or speed of the UAV may be known or determined as the UAV is tracked by the light source and the orientation of the light source updated so that the emitted light remains aligned with the UAV as the UAV aerially navigates.

In one implementation, the light source or a computing resource coupled to the light source receives or determines a position of a UAV. Based on the position of the UAV and the location of the light source, the light source is oriented such that the light emitted from the light source is directed toward the position of the UAV.

Likewise, the UAV may receive or determine a location of the light source and/or the viewing location. For example, the geographic coordinates of light source locations may be stored in a memory of the UAV. Alternatively, the UAV may include one or more light sensors that detect the light when it is aligned with the UAV and determine a direction from which the light is emitted. The UAV may also receive and/or determine a location of a viewing location toward which the light is to be reflected. For example, the UAV may obtain images (e.g., red-green-blue images) that include the viewing location and process those images to determine the location of the viewing location and/or an observer at the viewing location. Based on the position of the UAV, the location of the light source and the location of the viewing location, a reflector of the UAV is oriented such that the light is reflected off the reflector and directed toward the viewing location.

As discussed further below, each UAV may have one or more reflectors coupled to the UAV, some of which may be stationary or fixedly coupled to the UAV and others of which may be adjustable with respect to the UAV. For example, one or more of the reflectors may be coupled to a gimbal that is mounted to the frame of the UAV. The gimbal is used by the UAV to orient the reflector based on the position of the UAV, the location of the light source, and the location of the viewing location such that the light emitted from the light source is reflected off the reflector toward the viewing location. In some implementations, the UAV may include a plurality of reflectors placed at various positions on the UAV that reflect the light in a pattern such that it can be received and processed to identify the UAV and/or determine an orientation of the UAV, as discussed further below with respect to FIG. 5.

Figure 4:
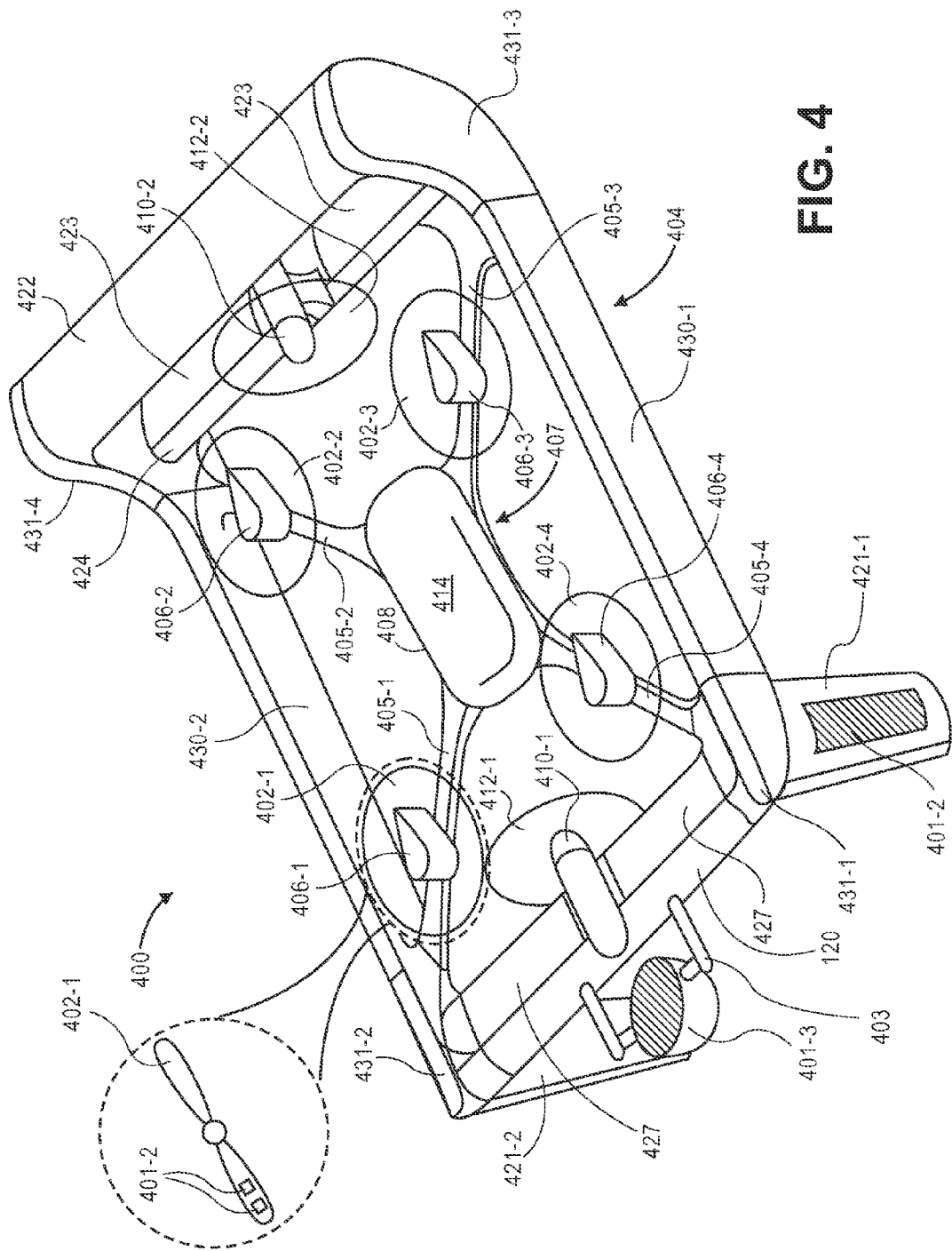
FIG. 4 depicts a view of an unmanned aerial vehicle configuration, according to an implementation.

FIG. 4 illustrates a view of a UAV 400, according to an implementation. As illustrated, the UAV 400 includes a perimeter frame 404 that includes a front wing 420, a lower rear wing 424, an upper rear wing 422, and two horizontal side rails 430-1, 430-2. The horizontal side rails 430 are coupled to opposing ends of the front wing 420 and opposing ends of the upper rear wing 422 and lower rear wing 424. In some implementations, the coupling may be with a corner junction, such as the front left corner junction 431-1, the front right corner junction 431-2, the rear left corner junction 431-3, the rear right corner junction 431-4. In such an example, the corner junctions are also part of the perimeter frame 404.

The components of the perimeter frame 404, such as the front wing 420, lower rear wing 424, upper rear wing 422, side rails 430-1, 430-2, and corner junctions 431 may be formed of any one or more suitable materials, such as graphite, carbon fiber, aluminum, titanium, etc., or any combination thereof. In the illustrated example, the components of the perimeter frame 404 of the UAV 400 are each formed of carbon fiber and joined at the corners using corner junctions 431. The components of the perimeter frame 404 may be coupled using a variety of techniques. For example, if the components of the perimeter frame 404 are carbon fiber, they may be fitted together and joined using secondary bonding, a technique known to those of skill in the art. In other implementations, the components of the perimeter frame 404 may be affixed with one or more attachment mechanisms, such as screws, rivets, latches, quarter-turn fasteners, etc., or otherwise secured together in a permanent or removable manner.

The front wing 420, lower rear wing 424, and upper rear wing 422 are positioned in a tri-wing configuration and each wing provides lift to the UAV 400 when the UAV is moving in a direction that includes a horizontal component. For example, the wings may each have an airfoil shape that causes lift due to the airflow passing over the wings during horizontal flight.

Opposing ends of the front wing 420 may be coupled to a corner junction 431, such as the front left corner junction 431-1 and front right corner junction 431-2. In some implementations, the front wing may include one or more flaps 427 or ailerons, that may be used to adjust the pitch, yaw, and/or roll of the UAV 400 alone or in combination with the lifting motors 406, lifting propellers 402, thrusting motors 410, thrusting propellers 412, and/or other flaps on the rear wings, discussed below. In some implementations, the flaps 427 may also be used as a protective shroud to further hinder access to the lifting propellers 402 by objects external to the UAV 400. For example, when the UAV 400 is moving in a vertical direction or hovering, the flaps 427 may be extended to increase the height of the protective barrier around a portion of the lifting propellers 402.

In some implementations, the front wing 420 may include two or more pairs of flaps 427, as illustrated in FIG. 1. In other implementations, for example if there is no front thrusting motor 410-1, the front wing 420 may only include a single flap 427 that extends substantially the length of the front wing 420. If the front wing 420 does not include flaps 427, the lifting motors 406 and lifting propellers 402, thrusting motors 410, thrusting propellers 412 and/or flaps of the rear wings may be utilized to control the pitch, yaw, and/or roll of the UAV 400 during flight.

Opposing ends of the lower rear wing 424 may be coupled to a corner junction 431, such as the rear left corner junction 431-3 and rear right corner junction 431-4. In some implementations, the lower rear wing may include one or more flaps 423 or ailerons, that may be used to adjust the pitch, yaw and/or roll of the UAV 400 alone or in combination with the lifting motors 406, lifting propellers 402, thrusting motors 410, thrusting propellers 412, and/or the flaps 427 of the front wing. In some implementations, the flaps 423 may also be used as a protective shroud to further hinder access to the lifting propellers 402 by objects external to the UAV 400. For example, when the UAV 400 is moving in a vertical direction or hovering, the flaps 423 may be extended, similar to the extending of the front flaps 427 of the front wing 420.

In some implementations, the rear wing 424 may include two or more flaps 423, as illustrated in FIG. 1 or two or more pairs of flaps. In other implementations, for example if there is no rear thrusting motor 410-2 mounted to the lower rear wing, the rear wing 424 may only include a single flap 423 that extends substantially the length of the lower rear wing 424. In other implementations, if the lower rear wing includes two thrusting motors, the lower rear wing may be configured to include three flaps 423, one on either end of the lower rear wing 424, and one between the two thrusting motors mounted to the lower rear wing 424.

Opposing ends of the upper rear wing 422 may be coupled to a corner junction 431, such as the rear left corner junction 431-3 and rear right corner junction 431-4. In some implementations, like the lower rear wing, the upper rear wing 422 may include one or more flaps (not shown) or ailerons, that may be used to adjust the pitch, yaw and/or roll of the UAV 400 alone or in combination with the lifting motors 406, lifting propellers 402, thrusting motors 410, thrusting propellers 412, and/or other flaps of other wings. In some implementations, the flaps may also be used as a protective shroud to further hinder access to the lifting propellers 402 by objects external to the UAV 400. For example, when the UAV 400 is moving in a vertical direction or hovering, the flaps may be extended, similar to the extending of the front flaps 427 of the front wing 420 or the flaps 423 of the lower rear wing.

The front wing 420, lower rear wing 424, and upper rear wing 422 may be positioned and sized proportionally to provide stability to the UAV while the UAV 400 is moving in a direction that includes a horizontal component. For example, the lower rear wing 424 and the upper rear wing 422 are stacked vertically such that the vertical lift vectors generated by each of the lower rear wing 424 and upper rear wing 422 are close together, which may be destabilizing during horizontal flight. In comparison, the front wing 420 is separated from the rear wings longitudinally such that the vertical lift vector generated by the front wing 420 acts together with the vertical lift vectors of the lower rear wing 424 and the upper rear wing 422, providing efficiency, stabilization and control.

In some implementations, to further increase the stability and control of the UAV 400, one or more winglets 421, or stabilizer arms, may also be coupled to and included as part of the perimeter frame 404. In the example illustrated with respect to FIG. 4, there are two front winglets 421-1 and 421-2 mounted to the underneath side of the front left corner junction 431-1 and the front right corner junction 431-2, respectively. The winglets 421 extend in a downward direction approximately perpendicular to the front wing 420 and side rails 430. Likewise, the two rear corner junctions 431-3, 431-4 are also formed and operate as winglets providing additional stability and control to the UAV 400 when the UAV 400 is moving in a direction that includes a horizontal component.

Coupled to the interior of the perimeter frame 404 is a central frame 407. The central frame 407 includes a hub 408 and motor arms 405 that extend from the hub 408 and couple to the interior of the perimeter frame 404. In this example, there is a single hub 408 and four motor arms 405-1, 405-2, 405-3, and 405-4. Each of the motor arms 405 extend from approximately a corner of the hub 408 and couple or terminate into a respective interior corner of the perimeter frame. Like the perimeter frame 404, the central frame 407 may be formed of any suitable material, such as graphite, carbon fiber, aluminum, titanium, etc., or any combination thereof. In this example, the central frame 407 is formed of carbon fiber and joined at the corners of the perimeter frame 404 at the corner junctions 431. Joining of the central frame 407 to the perimeter frame 404 may be done using any one or more of the techniques discussed above for joining the components of the perimeter frame 404.

Lifting motors 406 are coupled at approximately a center of each motor arm 405 so that the lifting motor 406 and corresponding lifting propeller 402 are within the substantially rectangular shape of the perimeter frame 404. In one implementation, the lifting motors 406 are mounted to an underneath or bottom side of each motor arm 405 in a downward direction so that the propeller shaft of the lifting motor that mounts to the lifting propeller 402 is facing downward. In other implementations, as illustrated in FIG. 4, the lifting motors 406 may be mounted to a top of the motor arms 405 in an upward direction so that the propeller shaft of the lifting motor that mounts to the lifting propeller 402 is facing upward. In this example, there are four lifting motors 406-1, 406-2, 406-3, 406-4, each mounted to an upper side of a respective motor arm 405-1, 405-2, 405-3, and 405-4.

In some implementations, multiple lifting motors may be coupled to each motor arm 405. For example, while FIG. 4 illustrates a quad-copter configuration with each lifting motor mounted to a top of each motor arm, a similar configuration may be utilized for an octo-copter. For example, in addition to mounting a motor 406 to an upper side of each motor arm 405, another lifting motor may also be mounted to an underneath side of each motor arm 405 and oriented in a downward direction. In another implementation, the central frame may have a different configuration, such as additional motor arms. For example, eight motor arms may extend in different directions and a lifting motor may be mounted to each motor arm.

The lifting motors may be any form of motor capable of generating enough rotational speed with the lifting propellers 402 to lift the UAV 400 and any engaged payload, thereby enabling aerial transport of the payload.

Mounted to each lifting motor 406 is a lifting propeller 402. The lifting propellers 402 may be any form of propeller (e.g., graphite, carbon fiber) and of a size sufficient to lift the UAV 400 and any payload engaged by the UAV 400 so that the UAV 400 can navigate through the air, for example, to deliver a payload to a delivery location. For example, the lifting propellers 402 may each be carbon fiber propellers having a dimension or diameter of twenty-four inches. While the illustration of FIG. 4 shows the lifting propellers 402 all of a same size, in some implementations, one or more of the lifting propellers 402 may be different sizes and/or dimensions. Likewise, while this example includes four lifting propellers 402-1, 402-2, 402-3, 402-4, in other implementations, more or fewer propellers may be utilized as lifting propellers 402. Likewise, in some implementations, the lifting propellers 402 may be positioned at different locations on the UAV 400. In addition, alternative methods of propulsion may be utilized as "motors" in implementations described herein. For example, fans, jets, turbojets, turbo fans, jet engines, internal combustion engines, and the like may be used (either with propellers or other devices) to provide lift for the UAV.

In addition to the lifting motors 406 and lifting propellers 402, the UAV 400 may also include one or more thrusting motors 410 and corresponding thrusting propellers 412. The thrusting motors and thrusting propellers may be the same or different from the lifting motors 406 and lifting propellers 402. For example, in some implementations, the thrusting propellers may be formed of carbon fiber and be approximately eighteen inches long. In other implementations, the thrusting motors may utilize other forms of propulsion to propel the UAV. For example, fans, jets, turbojets, turbo fans, jet engines, internal combustion engines, and the like may be used (either with propellers or with other devices) as the thrusting motors.

The thrusting motors and thrusting propellers may be oriented at approximately ninety degrees with respect to the perimeter frame 404 and central frame 407 of the UAV 400 and utilized to increase the efficiency of flight that includes a horizontal component. For example, when the UAV 400 is traveling in a direction that includes a horizontal component, the thrusting motors may be engaged to provide a horizontal thrust force via the thrusting propellers to propel the UAV 400 horizontally. As a result, the speed and power utilized by the lifting motors 406 may be reduced. Alternatively, in selected implementations, the thrusting motors may be oriented at an angle greater or less than ninety degrees with respect to the perimeter frame 404 and the central frame 407 to provide a combination of thrust and lift.

In the example illustrated in FIG. 4, the UAV 400 includes two thrusting motors 410-1, 410-2 and corresponding thrusting propellers 412-1, 412-2. Specifically, in the illustrated example, there is a front thrusting motor 410-1 coupled to and positioned near an approximate mid-point of the front wing 420. The front thrusting motor 410-1 is oriented such that the corresponding thrusting propeller 412-1 is positioned inside the perimeter frame 404. The second thrusting motor is coupled to and positioned near an approximate mid-point of the lower rear wing 424. The rear thrusting motor 410-2 is oriented such that the corresponding thrusting propeller 412-2 is positioned inside the perimeter frame 404.

While the example illustrated in FIG. 4 illustrates the UAV with two thrusting motors 410 and corresponding thrusting propellers 412, in other implementations, there may be fewer or additional thrusting motors and corresponding thrusting propellers. For example, in some implementations, the UAV 400 may only include a single rear thrusting motor 410 and corresponding thrusting propeller 412. In another implementation, there may be two thrusting motors and corresponding thrusting propellers mounted to the lower rear wing 424. In such a configuration, the front thrusting motor 410-1 may be included or omitted from the UAV 400. Likewise, while the example illustrated in FIG. 4 shows the thrusting motors oriented to position the thrusting propellers inside the perimeter frame 404, in other implementations, one or more of the thrusting motors 410 may be oriented such that the corresponding thrusting propeller 412 is oriented outside of the protective frame 404.

The perimeter frame 404 provides safety for objects foreign to the UAV 400 by inhibiting access to the lifting propellers 402 from the side of the UAV 400, provides protection to the UAV 400, and increases the structural integrity of the UAV 400. For example, if the UAV 400 is traveling horizontally and collides with a foreign object (e.g., wall, building), the impact between the UAV 400 and the foreign object will be with the perimeter frame 404, rather than a propeller. Likewise, because the frame is interconnected with the central frame 407, the forces from the impact are dissipated across both the perimeter frame 404 and the central frame 407.

The perimeter frame 404 also provides a surface upon which one or more components of the UAV 400 may be mounted. Alternatively, or in addition thereto, one or more components of the UAV may be mounted or positioned within the cavity of the portions of the perimeter frame 404. For example, one or more transmitters and/or receivers and corresponding antennas may be mounted on or in the front wing 420. The antennas may be used to transmit and/or receive wireless communications. For example, the antennas may be utilized for Wi-Fi, satellite, near field communication ("NFC"), cellular communication, or any other form of wireless communication. Other components, such as cameras, time of flight sensors, accelerometers, inclinometers, distance-determining elements, gimbals, Global Positioning System (GPS) receiver/transmitter, radars, illumination elements, speakers, and/or any other component of the UAV 400 or the UAV control system (discussed below), etc., may likewise be mounted to or in the perimeter frame 404. Likewise, reflectors, such as retroreflectors, reflective identifiers, etc. may be mounted to the perimeter frame 404 to aid in the identification and/or visual tracking of the UAV 400. For example, a reflector 401-3 may be mounted to a gimbal 403 that is affixed to the frame of the UAV 400. As discussed herein, the gimbal 403 may be adjusted to alter the orientation of a reflector 401-3 such that light reflected off the reflector 401-3 is directed toward a viewing location. In some implementations, the reflector 401-3 is a retroreflector.

Likewise, other reflectors 401 may be mounted at other locations on the UAV 400. For example, reflectors, such as reflective tape 401-2, may be mounted to the side of the UAV 400, such as along the winglets 421. In other implementations, one or more reflectors may be affixed to an underneath side of one or more of the propellers 402, such as the reflectors 401-2 mounted to the underneath side of propeller 402-1. In some implementations in which reflectors are mounted to an underneath side of a propeller 402, the light may periodically reflect off the reflector as the propeller passes through the light. As a result, the light is reflected back to the viewing location at a frequency that corresponds with the rotational speed of the propeller. As discussed further below with respect to FIG. 5, a plurality of reflectors of different sizes, shapes, and/or types may be coupled to various portions of the UAV 400.

In some implementations, the perimeter frame 404 may also include a permeable material (e.g., mesh, screen) that extends over the top and/or lower surface of the perimeter frame 404 enclosing the central frame, lifting motors, and/or lifting propellers.

A UAV control system 414 is also mounted to the central frame 407. In this example, the UAV control system 414 is mounted to the hub 408 and is enclosed in a protective barrier. The protective barrier may provide the control system 414 weather protection so that the UAV 400 may operate in rain and/or snow without disrupting the control system 414. In some implementations, the protective barrier may have an aerodynamic shape to reduce drag when the UAV is moving in a direction that includes a horizontal component. The protective barrier may be formed of any materials including, but not limited to, graphite-epoxy, Kevlar, and/or fiberglass. In some implementations, multiple materials may be utilized. For example, Kevlar may be utilized in areas where signals need to be transmitted and/or received.

Likewise, the UAV 400 includes one or more power modules (not shown). The power modules may be positioned inside the cavity of the side rails 430-1, 430-2. In other implementations, the power modules may be mounted or positioned at other locations of the UAV. The power modules for the UAV may be in the form of battery power, solar power, gas power, super capacitor, fuel cell, alternative power generation source, or a combination thereof. For example, the power modules may each be a 6000 mAh lithium-ion polymer battery, or polymer lithium ion (Lipoly, Li-Pol, LiPo, LIP, PLI or Lip) battery. The power module(s) are coupled to and provide power for the UAV control system 414, the lifting motors 406, the thrusting motors 410, and the payload engagement mechanism (not shown).

In some implementations, one or more of the power modules may be configured such that it can be autonomously removed and/or replaced with another power module while the UAV is landed or in flight. For example, when the UAV lands at a location, the UAV may engage with a charging member at the location that will recharge the power module.

As mentioned above, the UAV 400 may also include a payload engagement mechanism (not shown). The payload engagement mechanism may be configured to engage and disengage items and/or containers that hold items (payload). In this example, the payload engagement mechanism is positioned beneath and coupled to the hub 408 of the frame 404 of the UAV 400. The payload engagement mechanism may be of any size sufficient to securely engage and disengage a payload. In other implementations, the payload engagement mechanism may operate as the container in which it contains item(s). The payload engagement mechanism communicates with (via wired or wireless communication) and is controlled by the UAV control system 414. Example payload engagement mechanisms are described in co-pending patent application Ser. No. 14/502,707, filed Sep. 30, 2014, titled "UNMANNED AERIAL VEHICLE DELIVERY SYSTEM," the subject matter of which is incorporated by reference herein in its entirety.

In some implementations, the UAV may include a first reflector that is located within the cavity of the payload engagement mechanism such that the first reflector reflects light toward a viewing location when no payload is engaged by the payload engagement mechanism. However, when a payload is engaged, the first reflector is covered by the payload such that the first reflector does not reflect light. Likewise, the payload may include a second reflector that is a different size, shape, and/or type such that it can be visually distinguished from the first reflector. When the payload is engaged by the engagement mechanism, the payload blocks the first reflector and the second reflector reflects light toward the viewing location.

Figure 5:
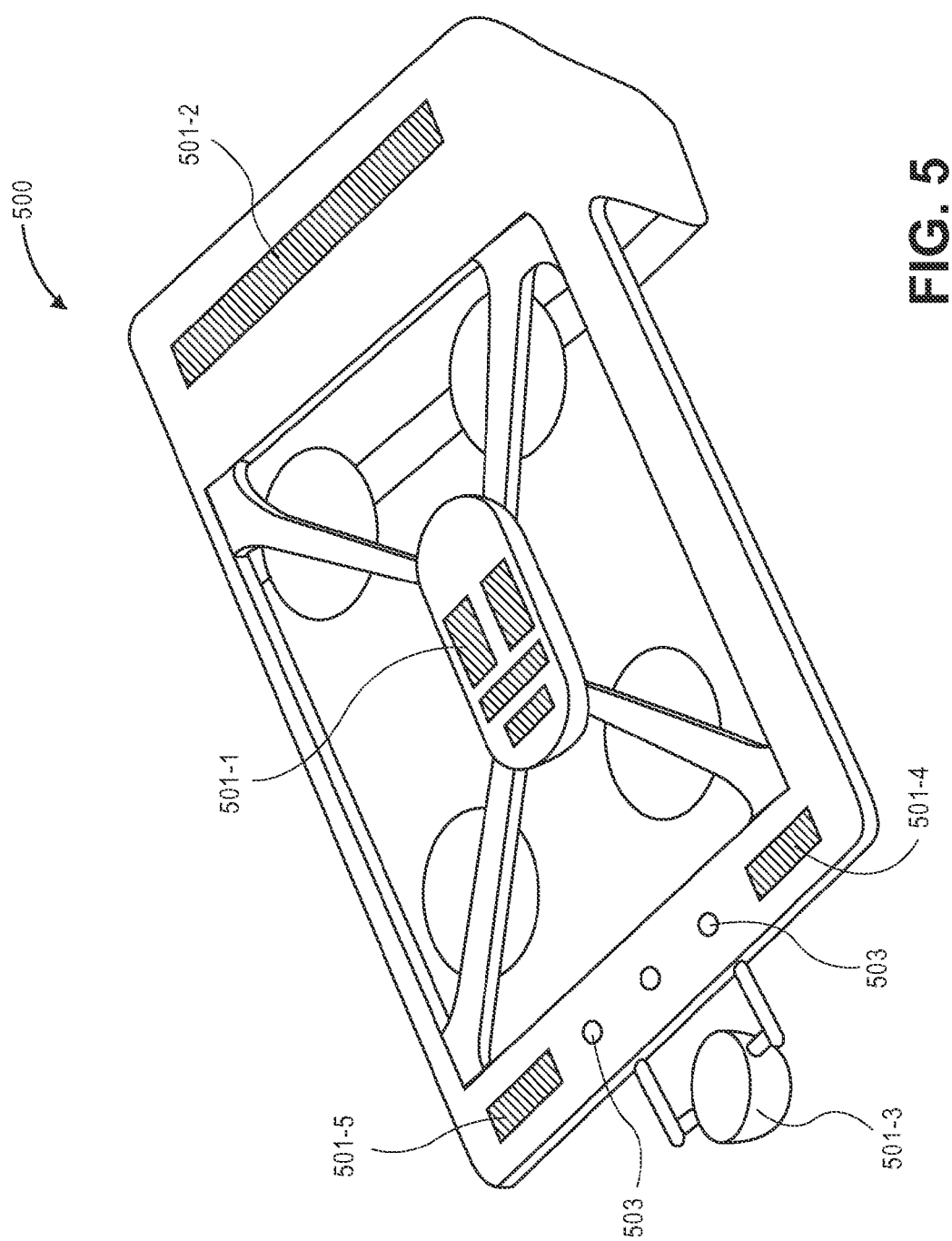
FIG. 5 depicts another view of an unmanned aerial vehicle configuration, according to an implementation.

FIG. 5 depicts another view of a UAV 500 configuration, according to an implementation. The view of the UAV illustrated in FIG. 5 is of the underneath or bottom side of a UAV 500, such as the UAV 400 illustrated in FIG. 4. As illustrated, any number, size, shape, and/or type of reflectors 501 may be coupled with the UAV so that the reflectors reflect light toward a viewing location. In some implementations, the reflectors may be positioned in a pattern that is unique to the UAV such that the reflected light can be used to identify the UAV and/or determine an orientation of the UAV 500. For example, the arrangement of reflectors 501-1 affixed to the core of the UAV may be unique to the UAV 500. Likewise, the positioning of the reflector 501-2 that is affixed to the underneath side of a rear wing of the UAV 500 and the reflectors 501-4, 501-5 affixed to opposing corners of the UAV may be used to determine an orientation of the UAV based on the arrangement of the light reflected from the reflectors 501.

The reflectors may be any size, shape, and/or type of reflectors. Likewise, some or all of the reflectors may be different sizes, shapes, and/or types. For example, some reflectors may be configured to reflect particular forms of light or colors of light while other types of reflectors reflector other forms and/or colors of light. Some or all of the reflectors may be configured such that they reflect a different color, pattern, or shape based on the angle of reflection of the light. Likewise, in some implementations, one or more of the reflectors may be an active reflector in that it is configured to selectively or periodically be enabled for reflection. For example, the UAV may include a screen or protective barrier that is positioned over a reflector at defined intervals such that light reflected by the reflector is received in a pattern at a viewing location. In such a configuration, information may be visually transmitted from the UAV to the viewing location using the pattern of the reflected light that corresponds to the International Morse Code.

In some implementations, the UAV 500 may include one or more light sensors 503 that are used to detect an intensity of light available to the UAV and cause the reflector 501-3 to be oriented toward the source with a highest light intensity so that the light can be reflected toward a viewing location. For example, rather than or in addition to receiving location information corresponding to a light source, the light sensors 503 may determine a location of a light source and cause the reflector 501-3 and/or the UAV to re-orient toward the light source such that the light from the light source will be reflected toward a viewing location. In such an implementation, the light source may be a light source intended to emit light in a direction of the position of the UAV. Alternatively, the light source may be ambient light available from urban and/or sub-urban areas (e.g., house lights, street lights, building lights). In another example, the light source may be the sun, moon, or other planetary source. In general, the light sensors may detect the direction of a highest intensity light source and cause the reflector 501 and/or the UAV 500 to orient in a direction such that light from the light source will be reflected off the reflector 501 and toward a viewing location so that the visibility of the UAV 500 is increased to a visual observer at the viewing location.

Figure 6:
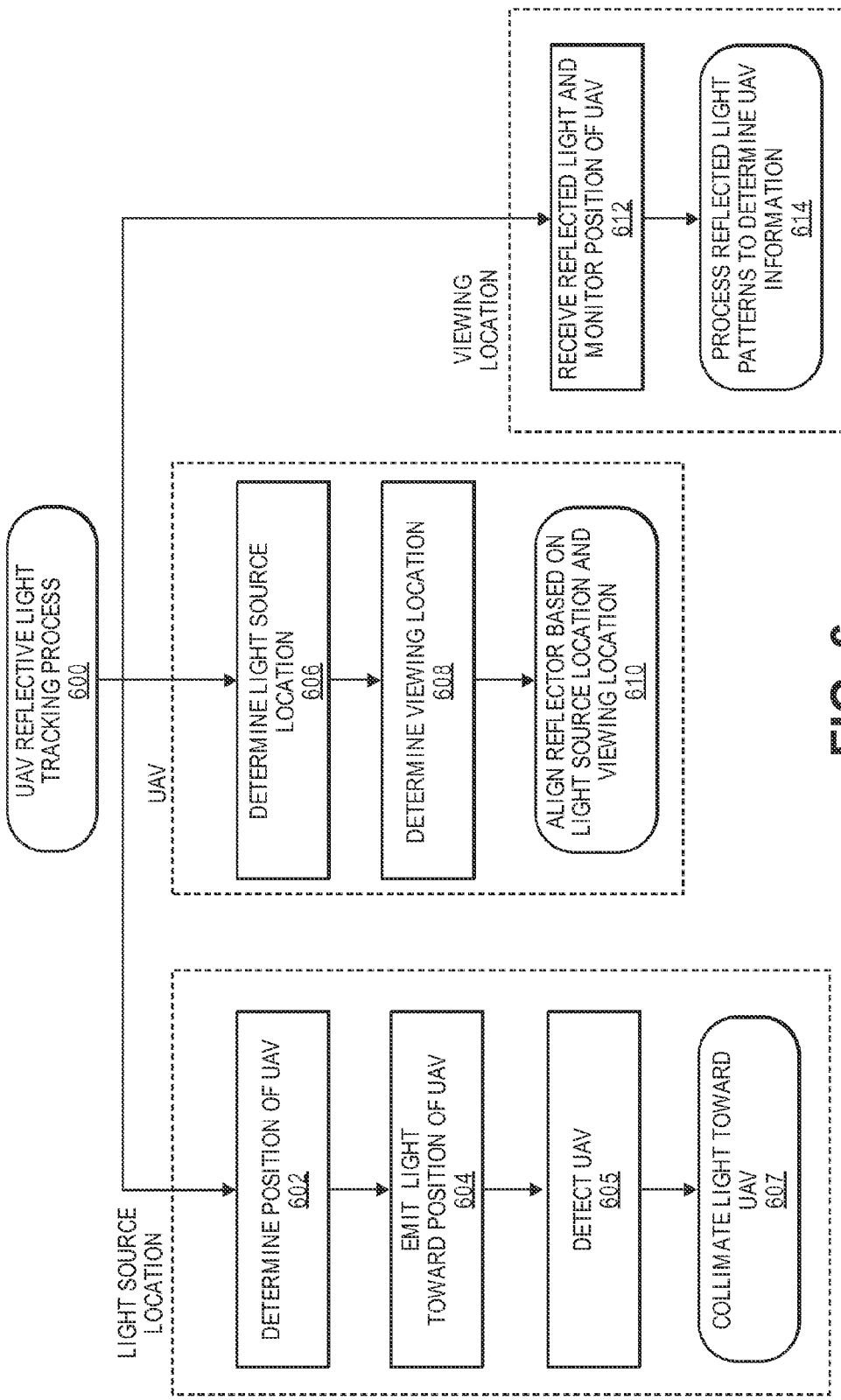
FIG. 6 is a flow diagram of an unmanned aerial vehicle reflective light tracking process, according to an implementation.

FIG. 6 is a flow diagram of a UAV reflective light tracking process 600, according to an implementation. This process, and each process described herein, may be implemented by the architectures described herein or by other architectures. The process is illustrated as a collection of blocks in a logical flow graph. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 600 can be divided into three aspects of the system. For example, process blocks 602, 604, 605, 607 are performed at the light source location by the light source or a computing resource that controls the light source. Blocks 606, 608, 610 are performed by the UAV. Blocks 612, 614 are performed at the viewing location by the visual observer and/or a computing resource. The blocks of the example process performed by the different systems may be performed in series or in parallel. Likewise, the order in which the blocks are performed may correspond to the order discussed or in a different order, and some of the blocks may be omitted.

As part of the example process 600, at the light source location a position of a UAV is determined, as in 602. The position of the UAV may be determined by receiving position information (e.g., geographic coordinates, altitude, heading, speed) from the UAV and/or by tracking a position of the UAV. For example, one or more UAV tracking components, such as a visual tracking system, time-of-flight tacking system, radar tracking system, etc. may be used to track a position or movement of the UAV.

Based on the determined position of the UAV, a light source is oriented in the direction of the UAV position such that light emitted from the light source is directed toward the position of the UAV, as in 604. The initially emitted light source may be collimated or diffuse. In one implementation, a diffuse light is emitted from the light source in a direction of the UAV and the light source, or a computing system operating in conjunction with the light source monitors for a reflection of the emitted light, as in 605. When a reflection is detected and thus the position of the UAV confirmed, the light is collimated or the intensity otherwise increased in the direction of the position of the detected reflection, as in 607. By collimating or otherwise increasing the intensity of the light, the reflected light that is visible to the visual observer is likewise increased, thereby extending the range at which visual contact may be maintained.

As another part of the example process 600, the UAV determines the location of the light source, as in 606. The light source location may be determined based on a known light source location maintained in a memory of the UAV, based on a transmission received by the UAV indicating the light source location, and or the UAV may detect a light source location. For example, the UAV may include an array of light sensors oriented in different directions. The intensity of light measured by the different light sensors may be compared and the light source location determined to correspond to a direction of the light sensor measuring a highest light intensity. In addition to determining a light source location, the UAV determines a viewing location to which reflected light is to be directed, as in 608. The viewing location may be determined based on a known viewing location maintained in a memory of the UAV, based on a transmission received by the UAV indicating the viewing location, and/or based on an actively determined position of the viewing location and/or the visual observer. For example, the UAV may obtain images of an area that includes the visual observer, process those images to detected the visual observer and determine the location of the viewing location based on the processed image.

Utilizing the known position of the UAV, the light source location and the viewing location, the UAV orients the UAV and/or a reflector such that the light emitted from the light source reflects off the reflector toward the viewing location such that it is visible to a visual observer positioned at the viewing location, as in 610. For example, the UAV may orient a reflector mounted on a gimbal or orient the frame of the UAV so that the light from the light source reflects off a reflector mounted to the frame of the UAV.

Finally, at the viewing location, reflected light is received from the reflector of the UAV and used to monitor a position of the UAV, as in 612. As discuss above, this monitoring may include a visual observer positioned at the viewing location maintaining visual contact with the UAV without the aid of any devices (e.g., cameras, optics).

Alternatively, or in addition thereto a computing resource may receive and monitor the position of the UAV. Likewise, in some implementations, the received reflected light may be processed to determine UAV information included in the received reflected light, as in 614. For example, as discussed above, the reflectors may be arranged in a pattern on the UAV such that the reflected light received from the arrangement of reflectors can be used to uniquely identify the UAV and/or determine an orientation of the UAV. Likewise, if the UAV includes an active reflector the received reflected light may include additional information in the form of Morse code, or other pattern based information. The UAV information may include, for example, health, power, position, payload, and/or other information about the UAV.

Figure 7:
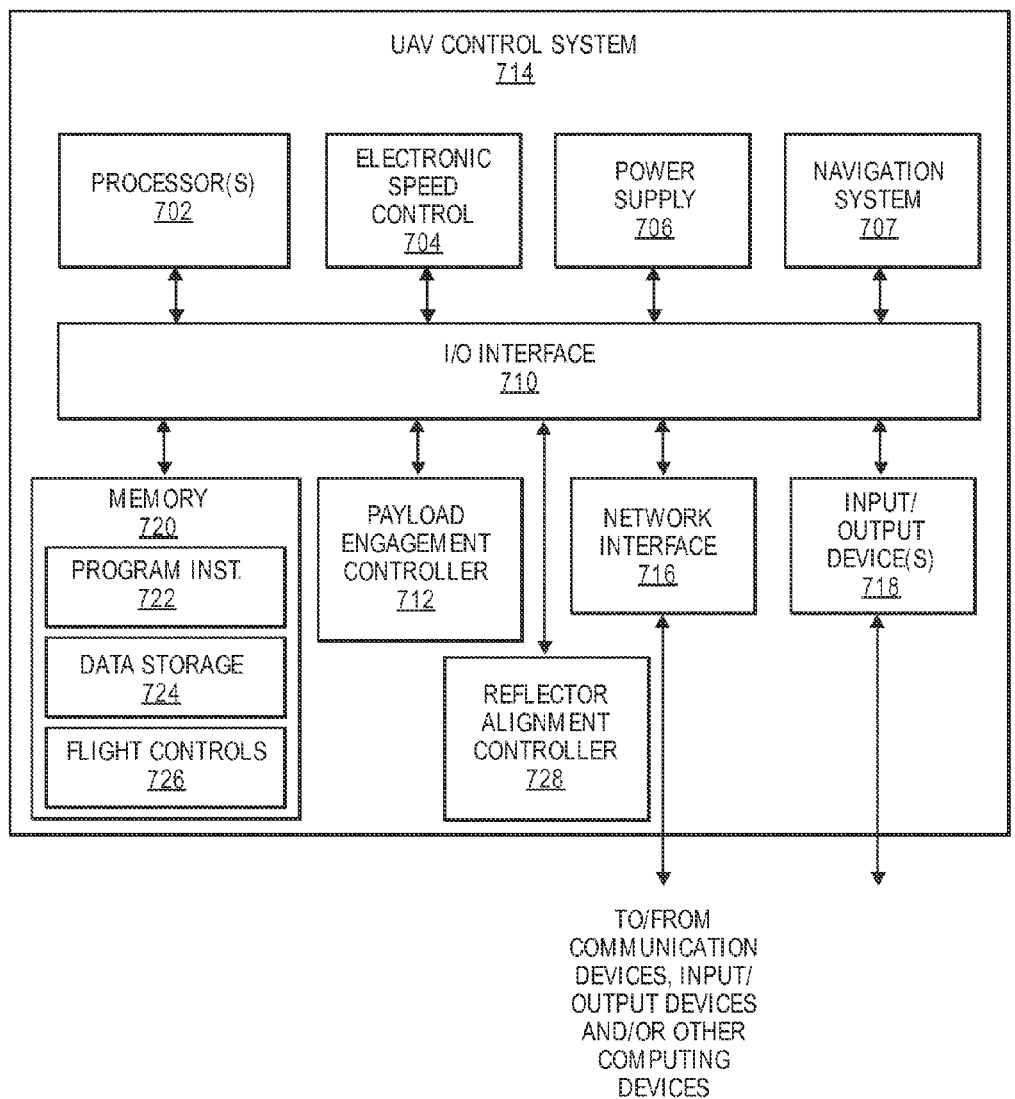
FIG. 7 is a block diagram of an illustrative implementation of an unmanned aerial vehicle control system that may be used with various implementations.

FIG. 7 is a block diagram illustrating an example UAV control system 714. In various examples, the block diagram may be illustrative of one or more aspects of the UAV control system 414 that may be used to implement the various systems and methods discussed herein and/or to control operation of the UAVs described herein. In the illustrated implementation, the UAV control system 714 includes one or more processors 702, coupled to a memory, e.g., a non-transitory computer readable storage medium 720, via an input/output (I/O) interface 710. The UAV control system 714 may also include electronic speed controls 704 (ESCs), power supply modules 706, a navigation system 707, and/or a payload engagement controller 712. In some implementations, the navigation system 707 may include an inertial measurement unit (IMU). The UAV control system 714 may also include a network interface 716, and one or more input/output devices 718.

In various implementations, the UAV control system 714 may be a uniprocessor system including one processor 702, or a multiprocessor system including several processors 702 (e.g., two, four, eight, or another suitable number). The processor(s) 702 may be any suitable processor capable of executing instructions. For example, in various implementations, the processor(s) 702 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 702 may commonly, but not necessarily, implement the same ISA.

The non-transitory computer readable storage medium 720 may be configured to store executable instructions, data, flight paths, flight control parameters, and/or data items accessible by the processor(s) 702. The data may include, among other information, light source locations, viewing locations, navigation paths, etc.

In various implementations, the non-transitory computer readable storage medium 720 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described herein, are shown stored within the non-transitory computer readable storage medium 720 as program instructions 722, data storage 724 and flight controls 726, respectively. In other implementations, program instructions, data, and/or flight controls may be received, sent, or stored upon different types of computer-accessible media, such as non-transitory media, or on similar media separate from the non-transitory computer readable storage medium 720 or the UAV control system 714. Generally speaking, a non-transitory, computer readable storage medium may include storage media or memory media such as magnetic or optical media coupled to the UAV control system 714 via the I/O interface 710. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via the network interface 716.

In one implementation, the I/O interface 710 may be configured to coordinate I/O traffic between the processor(s) 702, the non-transitory computer readable storage medium 720, and any peripheral devices, the network interface 716 or other peripheral interfaces, such as input/output devices 718. In some implementations, the I/O interface 710 may perform any necessary protocol, timing or other data transformations to convert data signals from one component (e.g., non-transitory computer readable storage medium 720) into a format suitable for use by another component (e.g., processor(s) 702). In some implementations, the I/O interface 710 may include support for devices attached through various types of peripheral buses, such as a variant of the Peripheral Component Interconnect (PCI) bus standard or the Universal Serial Bus (USB) standard, for example. In some implementations, the function of the I/O interface 710 may be split into two or more separate components, such as a north bridge and a south bridge, for example. Also, in some implementations, some or all of the functionality of the I/O interface 710, such as an interface to the non-transitory computer readable storage medium 720, may be incorporated directly into the processor(s) 702.

The ESCs 704 communicate with the navigation system 707 and adjust the rotational speed of each lifting motor(s) and/or the thrusting motor(s) to stabilize the UAV and guide the UAV along a determined flight path. The navigation system 707 may include a GPS, indoor positioning system (IPS), IMU or other similar systems and/or sensors that can be used to navigate the UAV 400 to and/or from a location. The payload engagement controller 712 communicates with actuator(s) or motor(s) (e.g., a servo motor) used to engage and/or disengage items.

The network interface 716 may be configured to allow data to be exchanged between the UAV control system 714, other devices attached to a network, such as other computer systems (e.g., remote computing resources), and/or with UAV control systems of other UAVs. For example, the network interface 716 may enable wireless communication between the UAV that includes the control system 714 and a UAV control system that is implemented on one or more remote computing resources. For wireless communication, an antenna of an UAV or other communication components may be utilized. As another example, the network interface 716 may enable wireless communication between numerous UAVs. In various implementations, the network interface 716 may support communication via wireless general data networks, such as a Wi-Fi network. For example, the network interface 716 may support communication via telecommunications networks, such as cellular communication networks, satellite networks, and the like.

Input/output devices 718 may, in some implementations, include one or more displays, imaging devices, thermal sensors, infrared sensors, time of flight sensors, accelerometers, pressure sensors, weather sensors, cameras, gimbals, landing gear, etc. Multiple input/output devices 718 may be present and controlled by the UAV control system 714. One or more of these sensors may be utilized to assist in landing as well as to avoid obstacles during flight.

As shown in FIG. 7, the memory may include program instructions 722, which may be configured to implement the example processes and/or sub-processes described herein. The data storage 724 may include various data stores for maintaining data items that may be provided for determining navigation paths, landing, identifying locations for disengaging items, engaging/disengaging the thrusting motors, determining viewing locations, determining light source locations, etc. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Finally, the UAV control system 714 also includes a reflector alignment controller 728 that determines an alignment or orientation for a reflector such that light reflected by the reflector will be directed toward a viewing location. As discussed above, the reflector alignment controller may receive or determine the UAV position, light source location, and viewing location and based upon that information determine an orientation for a reflector and/or the frame of the UAV such that the light from the light source will reflect off the reflector toward the viewing location, thereby increasing the visibility of the UAV and extending distance at which visual contact may be maintained.

Those skilled in the art will appreciate that the UAV control system 714 is merely illustrative and is not intended to limit the scope of the present disclosure. In particular, the computing system and devices may include any combination of hardware or software that can perform the indicated functions. The UAV control system 714 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated UAV control system 714. Some or all of the system components or data structures may also be stored (e.g., as instructions or structured data) on a non-transitory, computer-accessible medium or a portable article to be read by an appropriate drive. In some implementations, instructions stored on a computer-accessible medium separate from the UAV control system 714 may be transmitted to the UAV control system 714 via transmission media or signals such as electrical, electromagnetic, or digital signals, conveyed via a communication medium such as a wireless link. Various implementations may further include receiving, sending, or storing instructions and/or data implemented in accordance with the foregoing description upon a computer-accessible medium. Accordingly, the techniques described herein may be practiced with other UAV control system configurations.

Figure 8:
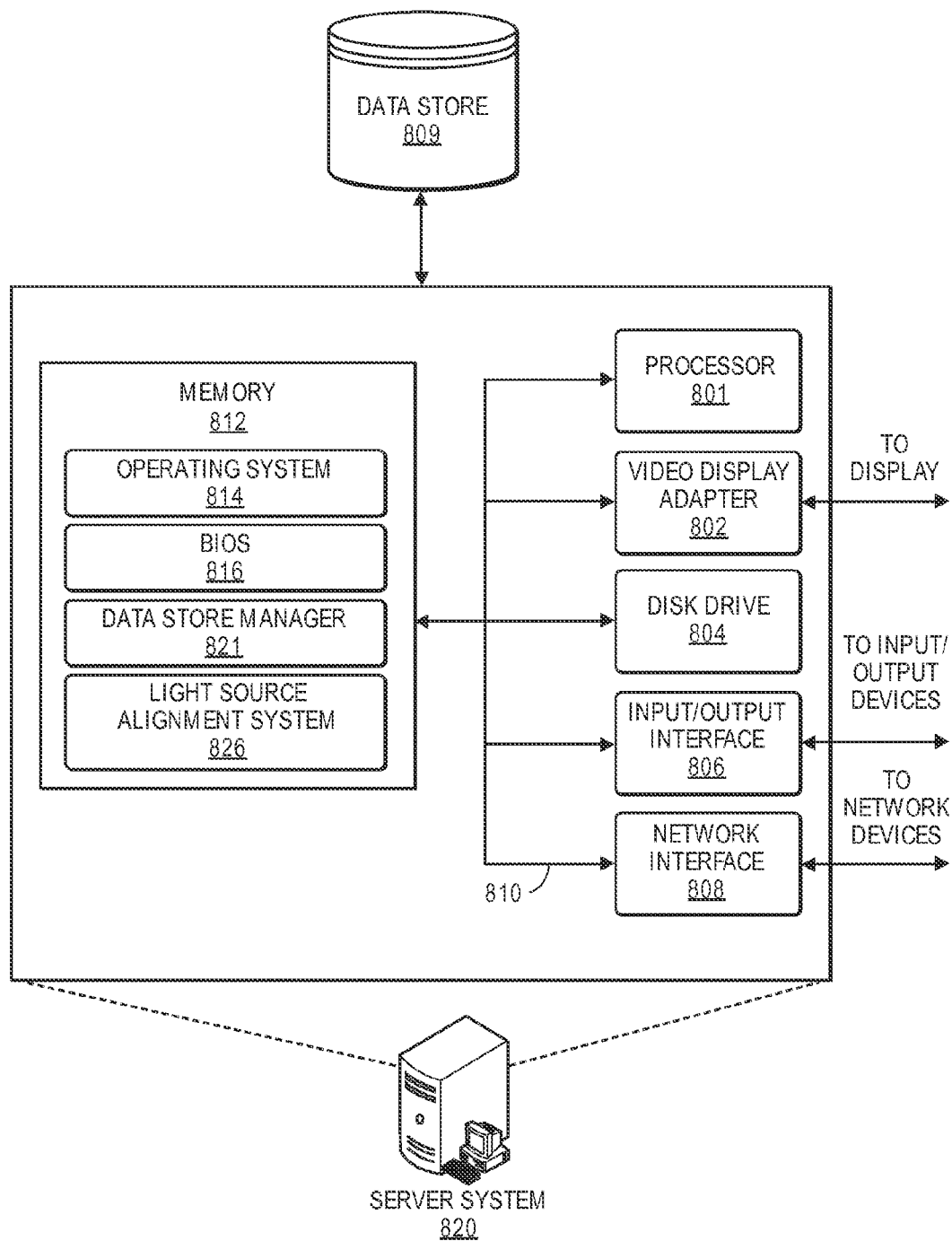
FIG. 8 is a pictorial diagram of an illustrative implementation of a server system that may be used in the implementations described herein.

FIG. 8 is a pictorial diagram of an illustrative implementation of a server system 820 that may be used in the implementations described herein. The server system 820 may include a processor 800, such as one or more redundant processors, a video display adapter 802, a disk drive 804, an input/output interface 806, a network interface 808, and a memory 812. The processor 800, the video display adapter 802, the disk drive 804, the input/output interface 806, the network interface 808, and/or the memory 812 may be communicatively coupled to each other by a communication bus 810.

The video display adapter 802 provides display signals to a display (not shown in FIG. 8) permitting a user of the server system 820 to monitor and configure operation of the server system 820, to view reflected light patterns received from the UAV, determine UAV position information, etc. The input/output interface 806 likewise communicates with external input/output devices not shown in FIG. 8, such as a mouse, keyboard, scanner, navigation controller, or other input and output devices that can be operated by a user of the server system 820. The network interface 808 includes hardware, software, or any combination thereof, to communicate with other computing devices. For example, the network interface 808 may be configured to provide communications between the server system 820 and other computing devices, such as the light source, and/or a UAV via a network.

The memory 812 generally comprises random access memory (RAM), read-only memory (ROM), flash memory, and/or other volatile or permanent memory. The memory 812 is shown storing an operating system 814 for controlling the operation of the server system 820. A binary input/output system (BIOS) 816 for controlling the low-level operation of the server system 820 is also stored in the memory 812.

The memory 812 additionally stores program code and data for providing network services to UAVs, and/or the light source alignment system 826. The program instructions enable communication with a data store manager application 821 to facilitate data exchange between the data store 809 and the light source alignment system.

As used herein, the term "data store" refers to any device or combination of devices capable of storing, accessing, and retrieving data, which may include any combination and number of data servers, databases, data storage devices and data storage media, in any standard, distributed or clustered environment. The server system 820 can include any appropriate hardware and software for integrating with the data store 809 as needed to execute aspects of one or more applications for a UAV, the light source alignment system and/or a viewing location.

The data store 809 can include several separate data tables, databases or other data storage mechanisms and media for storing data relating to a particular aspect. For example, the illustrated data store 809 includes mechanisms for maintaining information related to operations, inventory, maps, GPS data, topography information, light source locations, viewing locations, navigation paths for UAVs, etc., which can be used to generate and deliver information to a light source, UAV, and/or the light source alignment system 826. It should be understood that there might be additional aspects that can be stored in the data store 809 and that additional data stores beyond the one illustrated may be included. The data store 809 is operable, through logic associated therewith, to receive instructions from the server system 820 and obtain, update or otherwise process data in response thereto.

The memory 812 may also include the light source alignment system 826, discussed above. The light source alignment system 826 may be executable by the processor 800 to implement one or more of the functions of the server system 820. In one implementation, the light source alignment system 826 may represent instructions embodied in one or more software programs stored in the memory 812. In another implementation, the light source alignment system 826 can represent hardware, software instructions, or a combination thereof.

The server system 820, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction in FIG. 8 should be taken as being illustrative in nature and not limiting to the scope of the disclosure.

Those skilled in the art will appreciate that, in some implementations, the functionality provided by the processes and systems discussed above may be provided in alternative ways, such as being split among more software modules or routines or consolidated into fewer modules or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that, in other implementations, the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various methods and systems as illustrated in the figures and described herein represent example implementations. The methods and systems may be implemented in software, hardware, or a combination thereof in other implementations. Similarly, the order of any method may be changed and various elements may be added, reordered, combined, omitted, modified, etc., in other implementations.

From the foregoing, it will be appreciated that, although specific implementations have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. An unmanned aerial vehicle ("UAV") reflective light tracking system, comprising:
   a UAV, including:

a frame;
a reflector coupled to the frame and oriented to receive and reflect a light emitted from a light source such that the light is visible at a viewing location; and
a transmitter for transmitting UAV position information indicating a position of the UAV;
a light source location, including:
a receiver for receiving the UAV position information from the UAV;
a light source for emitting a collimated light toward the position of the UAV; and
an alignment component coupled to the light source to orient the light source in a direction based on the received position of the UAV.

2. The system of claim 1, wherein the UAV further includes:
a gimbal coupled between the frame and the reflector, the gimbal adjustable to orient the reflector in a direction of the light source location.

3. The system of claim 1, wherein the light source location and the viewing location are a same location such that a visual observer at the light source location can maintain visual contact with the UAV as the collimated light is reflected by the reflector of the UAV.

4. The system of claim 1, wherein:
the light source location and the viewing location are geographically distinct; and
a visual observer at the viewing location can maintain visual contact with the UAV as the collimated light emitted from the light source at the light source location is reflected by the reflector of the UAV to the viewing location.

5. An unmanned aerial vehicle (UAV), comprising:
a frame;
a plurality of reflectors coupled to the frame and arranged in a pattern; and
a reflector alignment controller coupled to at least one of the plurality of reflectors to orient the reflector based at least in part on a position of the UAV, a determined location of a light source, and a determined location of a viewing location such that light from the light source will reflect off the at least one of the plurality of reflectors and be visible to a visual observer at the viewing location.

6. The UAV of claim 5, further comprising:
a propeller; and
a first reflector coupled to the propeller, wherein the light is reflected by the first reflector at a frequency that corresponds with a rotational speed of the propeller.

7. The UAV of claim 5, further comprising:
a detachable payload; and
a first reflector positioned on the UAV such that:
the detachable payload blocks the light from reflecting off the first reflector when the payload is engaged by an engagement mechanism of the UAV; and
the light is reflected by the first reflector when the payload is disengaged by the engagement mechanism of the UAV.

8. The UAV of claim 7, further comprising a second reflector positioned on the payload such that the light is reflected by the second reflector when the payload is engaged by the engagement mechanism of the UAV.

9. The UAV of claim 5, further comprising:
a first reflector of the plurality of reflectors configured to reflect a first color of visible light; and
a second reflector of the plurality of reflectors configured to reflect a second color of visible light that is different than the first color.

10. The UAV of claim 5, further comprising:
a first reflector of the plurality of reflectors aligned to reflect the light back to the light source location.

11. The UAV of claim 5, further comprising:
a navigation system configured to determine the position of the UAV; and
a transmitter for transmitting position information representative of the position of the UAV to the light source location.

12. The UAV of claim 11, wherein the light source is ambient light or sun light.

13. The UAV of claim 5, wherein the light source location is a landing area for the UAV, the light source further configured to provide guidance to the UAV to aid in a landing of the UAV at the landing area.

14. The UAV of claim 5, wherein:
the plurality of reflectors reflect the light in a pattern; and
the pattern provides at least one of an identification of the UAV or an orientation of the UAV.

15. A method, comprising:
determining a position of an unmanned aerial vehicle ("UAV");
emitting from a light source a light in a direction of the position of the UAV such that the light will reflect off a reflector coupled to the UAV;
receiving a reflected light reflected off the reflector coupled to the UAV; and
processing the reflected light to determine at least one of an identification of the UAV, an orientation of the UAV, or a rotational speed of at least one propeller of the UAV.

16. The method of claim 15, further comprising:
subsequent to receiving the reflected light, increasing an intensity of light emitted from the light source in the direction of the position of the UAV.

17. The method of claim 15, further comprising:
receiving at a first viewing location, during a first portion of an aerial navigation of the UAV, the reflected light reflected off the reflector such that the UAV is visible to a first visual observer at the first viewing location; and
receiving at a second viewing location that is geographically distinct from the first viewing location, during a second portion of the aerial navigation of the UAV, the reflected light reflected off the reflector such that the UAV is visible to a second visual observer at the second viewing location.

18. The method of claim 17, wherein the first visual observer is at least one of an operator of the UAV or communicating with an operator of the UAV.

19. The method of claim 17, wherein the first viewing location and the second viewing location are two of a plurality of viewing locations along a navigation path of the UAV, the method further comprising:
receiving at each of the plurality of viewing locations and during respective portions of the aerial navigation of the UAV, reflected light reflected off the reflector of the UAV such that visual contact is maintained with the UAV as the UAV aerially navigates the navigation path.

20. The method of claim 15, further comprising:
transmitting to the UAV viewing location information indicating a location of a viewing location so that the UAV can orient the reflector such that light reflected off the reflector will be visible to a visual observer at the viewing location.

\* \* \* \* \*